United States Patent [19]

Sawanobori

[11] Patent Number: 5,526,047
[45] Date of Patent: Jun. 11, 1996

[54] SCHEME CAMERA EMPLOYING COMPRESSION RECORDING

[75] Inventor: Keiji Sawanobori, Tokyo, Japan

[73] Assignee: Asahi Kogaku Kogyo Kabushiki Kaisha, Tokyo, Japan

[21] Appl. No.: 311,358

[22] Filed: Sep. 23, 1994

[30] Foreign Application Priority Data

Sep. 24, 1993 [JP] Japan ................................ 5-258970

[51] Int. Cl.⁶ ...................................... H04N 5/232
[52] U.S. Cl. ........................ 348/222; 348/231; 348/420
[58] Field of Search ............................ 348/207, 222, 348/231, 311, 312, 420

[56] References Cited

U.S. PATENT DOCUMENTS 5,047,869  9/1991  Aoki et al. .............................. 358/341
5,067,029  11/1991  Takahashi ............................ 348/231 X
5,298,990  3/1994  Otaka et al. .......................... 348/420

Primary Examiner—Wendy R. Greening
Attorney, Agent, or Firm—Greenblum & Bernstein

[57] ABSTRACT

A CCD digital camera used for storing an image of an object has an imaging device for receiving an image of the object and for generating a digital signal corresponding to the image. A memory stores a predetermined portion of the digital signal, which is less than all of the digital signal, generated by the imaging device. A controller controls the transfer of the predetermined portion of the digital signal from the imaging device to the memory. A data compression unit compresses the predetermined portion of the digital signal stored in the memory and outputs a compressed signal corresponding to the predetermined portion of the digital signal to a storage device which stores the compressed digital signal. The controller inhibits transfer of a subsequent predetermined portion of the digital signal to the memory, until all of the predetermined portion of the digital signal has been compressed by the data compression unit and stored in the storage device.

5 Claims, 5 Drawing Sheets

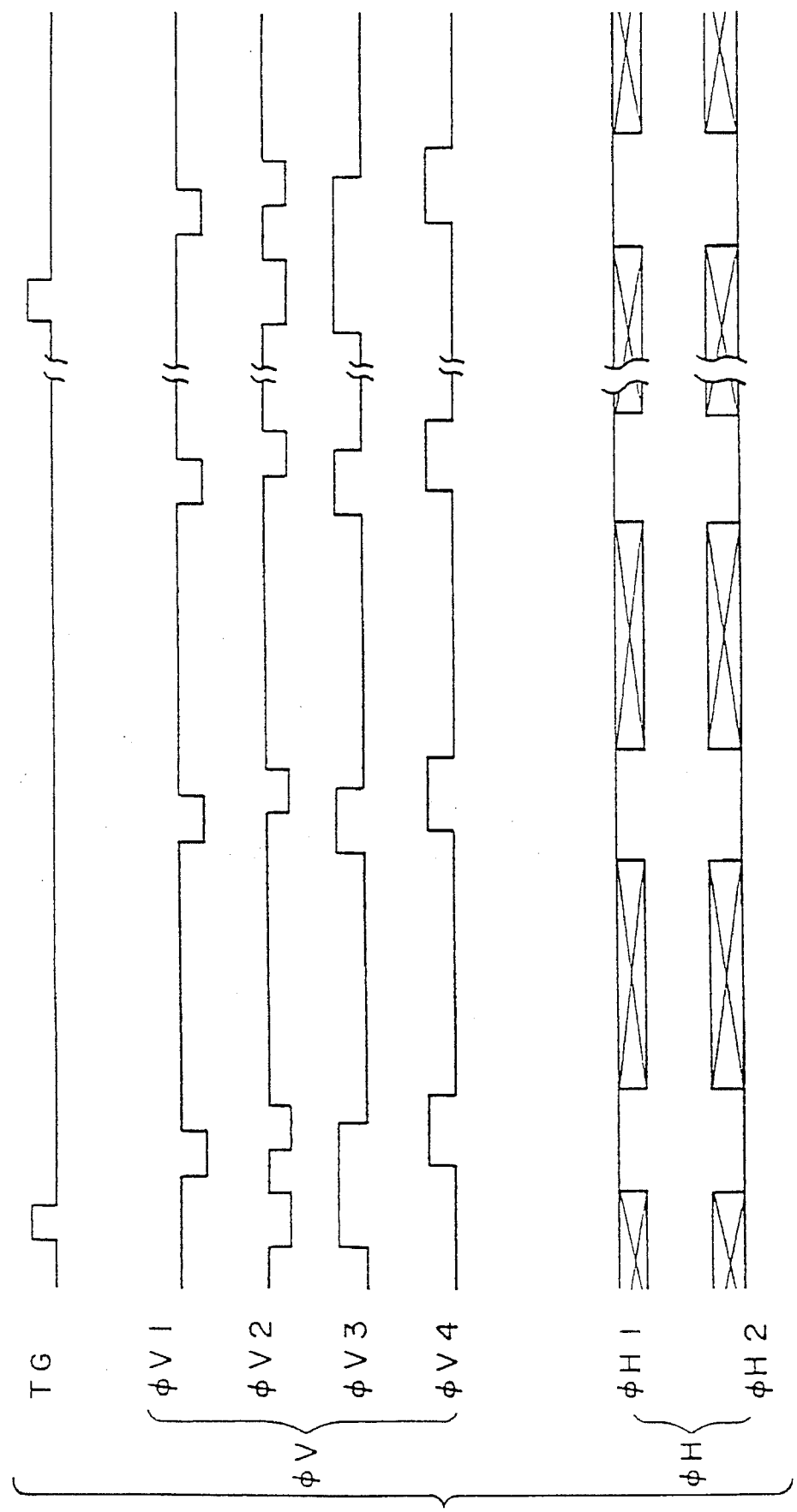

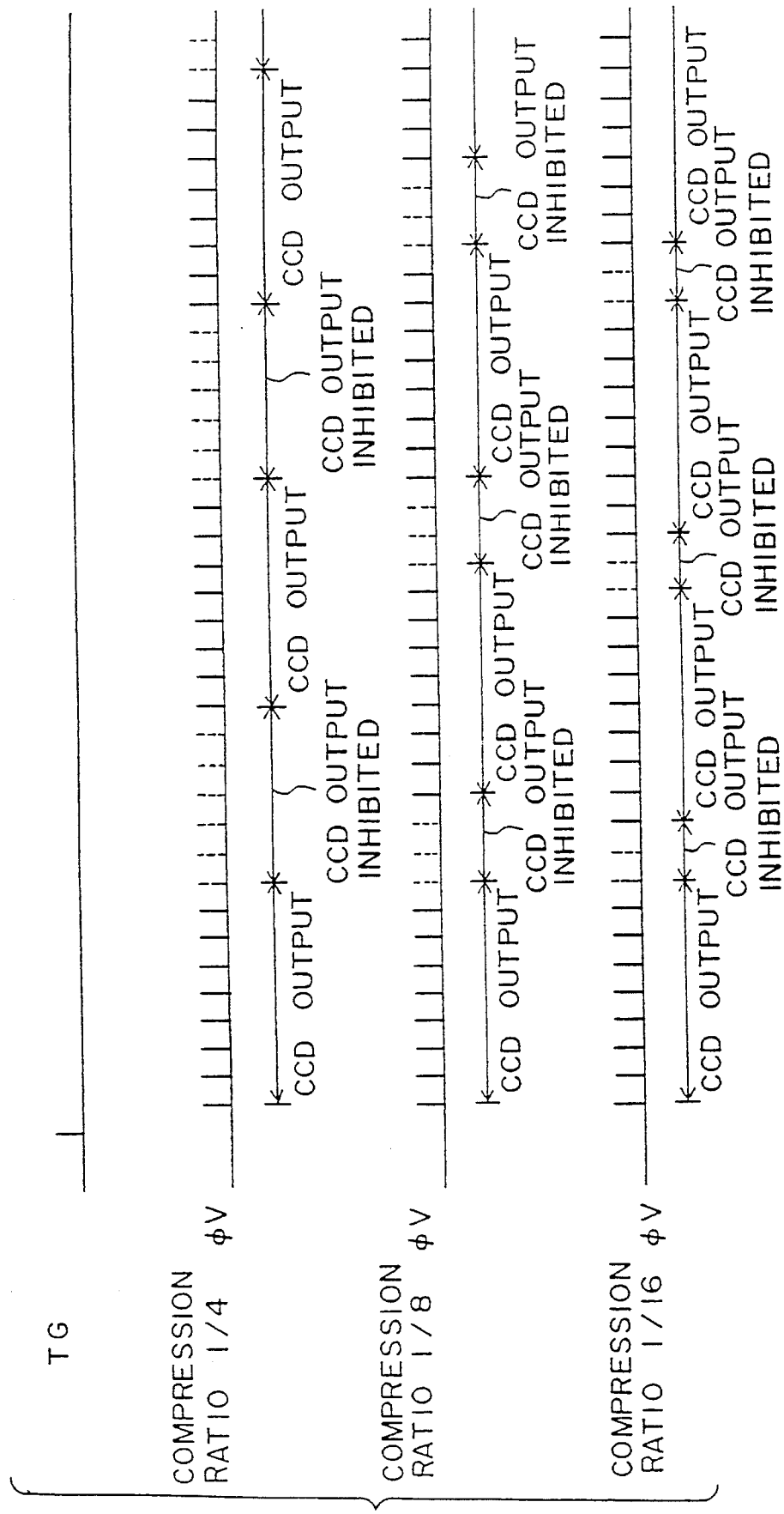

SCHEME CAMERA EMPLOYING COMPRESSION RECORDING

BACKGROUND OF THE INVENTION

The present invention relates to a camera that can record an image of an object to be photographed using a CCD (Charge Coupled Device), and more specifically, to a camera in which image data obtained using a CCD is compressed and recorded.

Recently, digital cameras which electronically store data related to a photographed image have become popular. The digital camera converts the optical image to electronic image data and digitally records the image data on a recording medium, such as an IC card. When the image is reproduced, the recorded digital data is retrieved from the storage medium and displayed on a display device or printed out as a hard copy image.

Generally, a CCD receives the optical image and outputs an electrical signal corresponding to the optical image. The electrical signal is A/D converted, then stored on a recording medium, such as a floppy disk or an IC memory card. The CCD is constructed such that photoelectric elements, such as photodiodes which convert the intensity of light into an electric charge, are arranged in a matrix. The charge generated in each element is transferred in vertical and horizontal directions. Thus, the image data for one image frame, which is obtained by exposing the CCD to an object image, is outputted as a series of data and transferred by horizontal and vertical CCD shift registers HCCD and VCCD, respectively and recorded onto the recording medium.

In this type of camera, since the size of the image data outputted by the CCD is large, if the image data is recorded as is, the recording medium can store only a small number of pictures. Therefore, the image data obtained by the CCD is compressed before it is recorded. When reproducing the image, the compressed data is read out and expanded.

If the camera uses the above described system, since the compression takes a certain period of time, the data outputted by the CCD should first be stored unmodified, in an image memory (a field memory or a frame memory). Then, the stored data is compressed. With this construction, a large capacity image memory is required, since a large amount of data must be compressed. However, a large capacity memory is physically large, resulting in the overall size of the camera being large. Further, a large capacity memory is expensive, thereby increasing the cost of manufacturing the camera.

SUMMARY OF THE INVENTION

It is, therefore, an object of the invention to provide an improved CCD digital camera which has a memory having a capacity that is relatively small and which is capable of compressing the image data and recording the same to the recording medium.

According to one aspect of the present invention, there is provided a CCD digital camera which includes:

an imaging device for receiving an image of an object to be photographed, the imaging device generating a digital signal corresponding to the received image;

a memory for storing a predetermined portion of the digital signal, the predetermined portion of the digital signal being less than all of the digital signal;

a controller for controlling a transfer of the predetermined portion of the digital signal from the imaging device to the memory;

a data compression unit for compressing the predetermined portion of the digital signal stored in the memory and outputting a compressed signal corresponding to the predetermined portion of the digital signal; and a storage device for storing the compressed digital signal.

The controller inhibits a transfer of a subsequent predetermined portion of the digital signal to the memory, until all of the predetermined portion of the digital signal has been compressed by the data compression unit and stored in the storage device.

According to another aspect of the present invention, there is provided a CCD digital camera having an optical system which forms an image of an object to be photographed, on an imaging device, the imaging device outputting a digital signal corresponding to the image. The camera further includes:

a controller for controlling the imaging device to output a predetermined portion of the digital signal, the predetermined portion of the digital signal being less than all of the digital signal;

a memory having a capacity for storing only the predetermined portion of the digital signal; and a data compression unit for compressing fractional portions of the predetermined portion of the digital signal. The fractional portions of the predetermined portion of the digital signal is read out from the memory in sequence until all of the predetermined portion of the digital signal has been compressed, the data compression unit outputting a compressed data signal corresponding to each of the fractional portions of the predetermined portion of the digital signal.

The camera further includes a storage device for storing the compressed data signal.

The above mentioned controller calculates a period of time required to compress all of the predetermined portion of the digital signal and store the compressed digital signal in the storage device, and inhibits a transfer of subsequent predetermined portions of the digital signal to the memory during the period of time.

According to a further aspect of the present invention, there is provided a method of storing an image of an object photographed using a CCD digital camera, the method including the steps of:

converting an optical image of an object to be photographed into a digital signal;

storing a predetermined portion of the digital signal in a memory, the predetermined portion of the digital signal being less than all of the digital signal;

compressing a fractional portion of the predetermined portion of the digital signal stored in the memory; and storing the compressed data in a storage device.

The above-mentioned steps of compressing the fractional portion and storing of the compressed data are repeated until all fractional portions of the predetermined portion of the digital signal have been compressed and stored in the storage device.

A storing of a subsequent predetermined portion of the digital signal in the memory is inhibited until all of the predetermined portion has been compressed and stored in the storage device.

DESCRIPTION OF THE ACCOMPANYING DRAWINGS

FIG. 3 is a timing diagram showing timing signals related to an operation of the CCD shown in FIG. 1;

FIG. 5 shows a diagram illustrating an allowance/inhibition of a transmission of a vertical drive signal of the CCD shown in FIG. 1.

DESCRIPTION OF THE EMBODIMENTS

Figure 1:
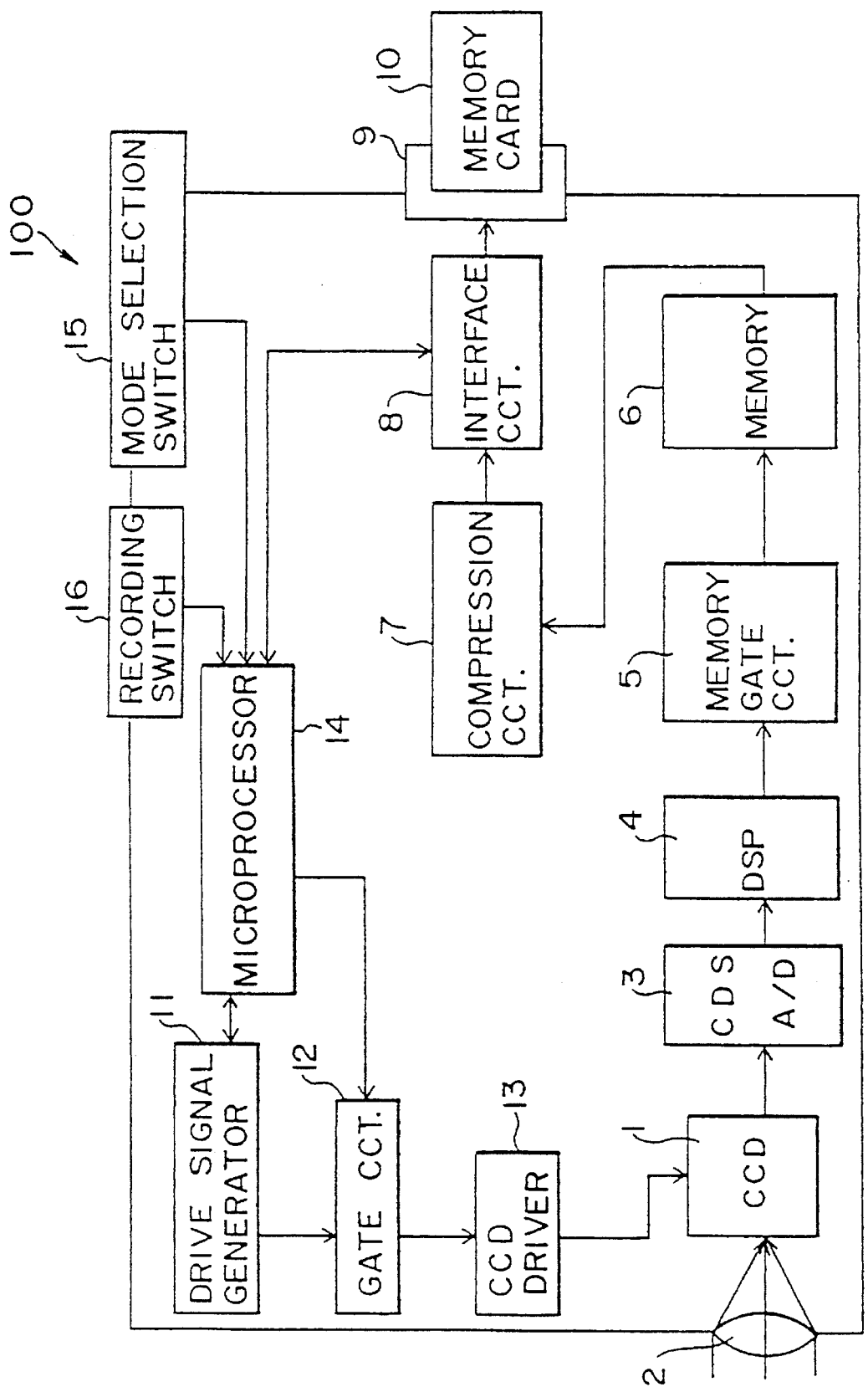
FIG. 1 is a block diagram of a CCD digital camera which embodies the present invention.

FIG. 1 is a block diagram of a CCD digital camera 100 embodying the present invention.

The CCD digital camera 100 has a CCD 1 which has 380,000 photodiodes arranged in a matrix. An image of an object to be photographed is formed, on a light receiving surface of the CCD 1, by an optical system 2. The CCD 1 then outputs image data corresponding to the image of the object. First, reset noise included in the image data is decreased or eliminated, and then, the image data is converted into digital image data in a CDS-A/D (correlation double sampling-analog/digital) converter 3. The digital image data is then transmitted to a DSP (digital signal processor) 4. In the DSP 4, the digital image data is formatted as a predetermined data signal. A memory gate circuit 5 allows the formatted data signal to be transmitted to a memory 6 at a predetermined timing. The size of the memory 6 is relatively small with respect to the entire data to be recorded. Further, the size of memory 6 is determined so that it can store the minimum amount of data that is required by compression circuit 7. This minimum amount of data is then transmitted to the compression circuit 7 and compressed. The compressed data is then recorded onto a memory card 10 which is connected to a connector 9 through an interface 8.

The camera 100 has a drive signal generator 11 for outputting a drive signal to be used for transferring the image data generated by the CCD 1. A gate circuit 12 controls the timing of the drive signal. The drive signal is inputted to a CCD driver 13. The CCD driver 13 drives the CCD 1, in accordance with the drive signal, to output image data sequentially to the CDS-A/D circuit 3.

The operation is controlled by a microprocessor 14. States of a mode selection switch 15 and a recording switch 16 are inputted to the microprocessor 14. The compression ratio of the image data is selected using the mode selection switch 15. When the recording switch 16 is depressed, the CCD 1 outputs the image data, which is then processed and recorded on the recording medium, as described above.

Figure 2:
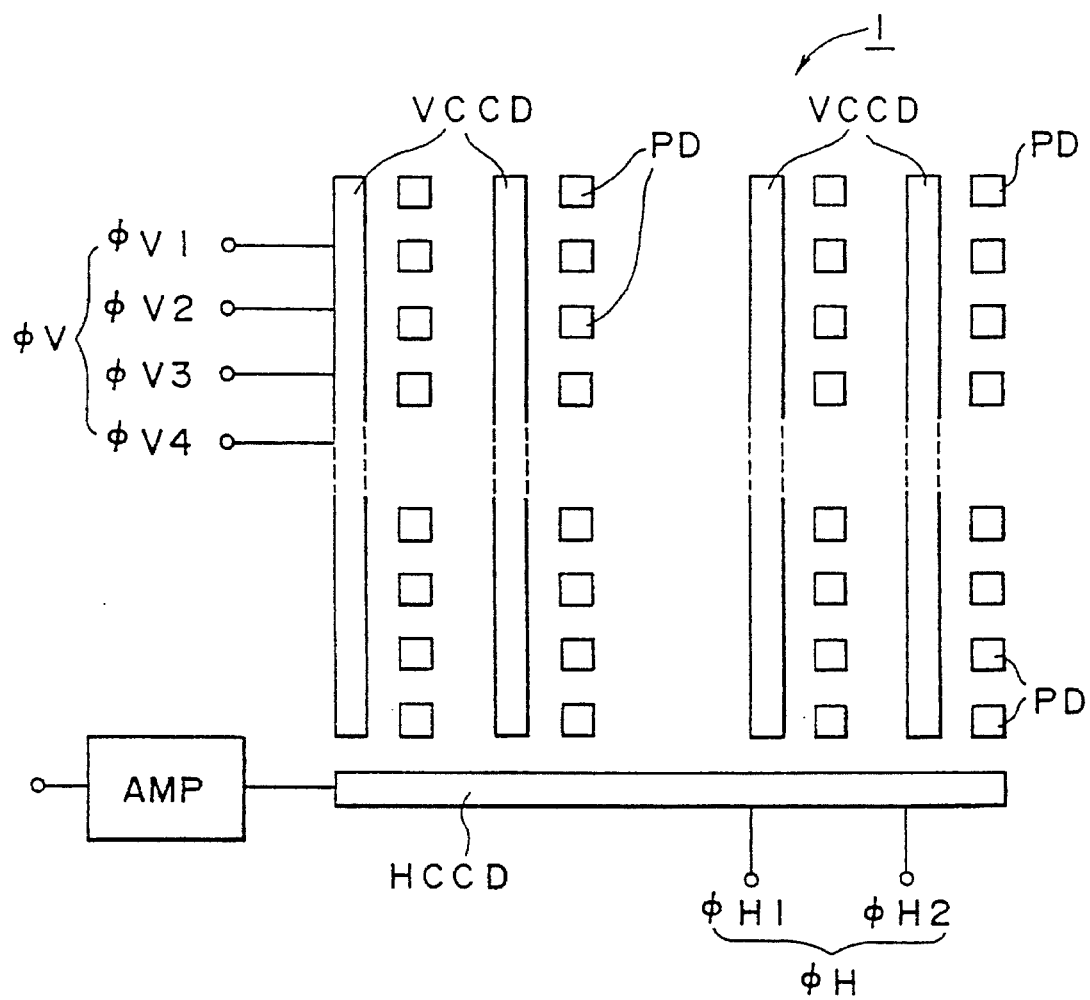
FIG. 2 shows a schematic of the construction of the CCD shown in FIG. 1.

FIG. 2 shows a schematic construction of the CCD 1. As described above, there are 380,000 photodiodes PD arranged in a matrix. In the matrix shown in FIG. 2, vertical transfer shift registers VCCD extend in a column direction as shown in FIG. 2. Further, on one side of the vertical transfer CCD shift registers VCCD, a horizontal transfer shift register HCCD extends in a row direction.

The output of the photodiode PD (i.e., the charge generated by the photodiodes PD), is transmitted to the VCCD in accordance with a charge transfer signal TG (FIG. 3). Then, in accordance with a vertical drive signal $\phi V$ ($\phi V1-\phi V4$), charge in the shift registers VCCD is transmitted to the shift register HCCD. The image data transferred to the shift register HCCD is transferred in the horizontal direction in accordance with a horizontal drive signal $\phi H$ ($\phi H1$, $\phi H2$), and outputted through an amplifier.

FIG. 3 is a timing chart showing the timing of the drive signals. When the charge transfer signal TG is HIGH, the image data is transferred from the CCD pixels to the shift registers VCCD. Then, one line of image data is transferred to the horizontal shift register HCCD, by applying the vertical drive signal $\phi V$ to the shift registers VCCD. Then, transfer of the charge in the shift register HCCD is performed in accordance with the horizontal drive signal $\phi H$. The drive signals are generated such that one line of image data is outputted synchronously with the vertical drive signal $\phi V$.

Figure 4:
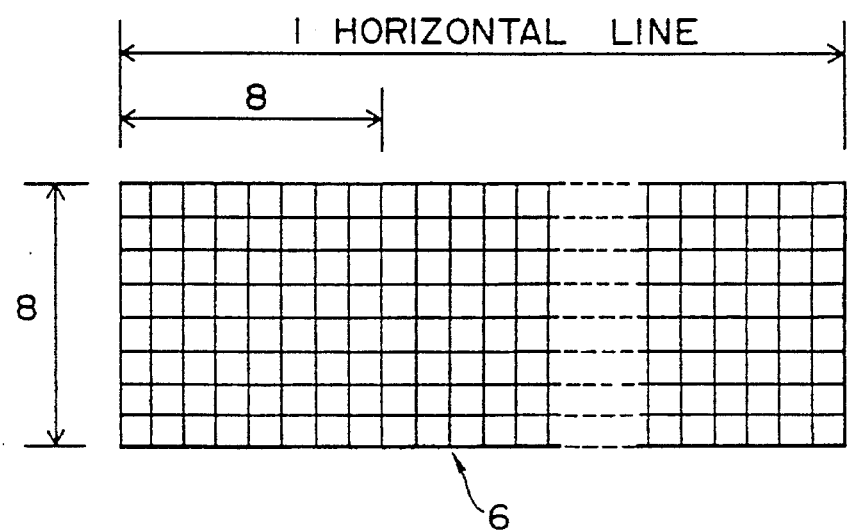
FIG. 4 shows a schematic map of a memory used in the CCD digital camera shown in FIG. 1.

FIG. 4 shows a schematic map of the memory 6. As described above, the memory 6 contains only a part of the data outputted by the CCD 1. The capacity of the memory 6 is determined in accordance with the amount of data (which is related to the number of the pixels), which are compressed by the compression circuit 7, at one time. In this embodiment, the compression is performed for units of 8×8 pixels. The capacity of the memory 6 is determined as follows:

Memory capacity=$N0 \times Ncmp$ where,

N0 is the number of pixels in one horizontal line of the CCD 1,

Ncmp is the number of horizontal lines of the CCD 1 that are be compressed at one time.

Since the number of horizontal lines of pixels of the CCD 1 is about 500, and only 8 lines are compressed at a time, the size of the memory 6 is about 1/62 the size of the memory that would be required if all the data outputted by the CCD 1 was stored synchronously.

The compression circuit 7 compresses the image data in blocks of 8×8 pixels, thereby reducing the size of the data to be stored. The image data is first stored in the memory 6, and then read out as an 8×8 pixel matrix data block. The size of the compressed data is determined in accordance with the compression ratio selected by the mode selection switch 15. In this embodiment, the size of the compressed data can be ¼, ⅛ or 1/16 the original size of the data.

The drive signal generator 11 generates the vertical drive signal $\phi V$ and the horizontal drive signal $\phi H$. The gate circuit 12 periodically inhibits a predetermined number of the vertical drive signals $\phi V$ from passing therethrough in accordance with an instruction outputted from the microprocessor 14. The number of vertical drive signals $\phi V$ which are inhibited, depends on the compression ratio selected with the mode selection switch 15.

In the digital camera 100 constructed as above, by depressing the recording button 16, the CCD 1 outputs image data corresponding to the image formed, by the optical system 2, on the surface of the CCD 1. The image data is transferred to the VCCD synchronously with the charge transfer signal TG which is generated by the drive signal generating section 11, and in accordance with the horizontal and vertical drive signals $\phi H$ and $\phi V$, the image data is then transmitted from the CDS-A/D converter 3 to the DSP 4. The digital data is then gated through memory gate circuit 5 and temporarily stored in the memory 6. The data stored in the 0 memory 6 is subsequently read out in a predetermined block (as described above), compressed, and recorded to the memory card 10 through interface 8.

The compression and recording operations take a relatively long period of time. More specifically, the recording operation (i.e., recording data to the memory card 10) takes 100–500 nsec per byte of data. During this recording period, the succeeding compression operation cannot be executed. In other words, the memory 6 is occupied by the image data being processed. If subsequent data is outputted by the CCD 1, the subsequent data cannot be stored in the memory 6. Thus, for a predetermined period, the microprocessor 14 inhibits the vertical drive signal φV from passing through the gate circuit 12 so that the signal is not transmitted to the CCD driver 13. Thus, during this period, the transfer of the image data in the shift registers VCCD does not occur.

When all the data stored in the memory 6 is compressed and recorded, the gate circuit 12 gates the vertical drive signal φV to the CCD driver 13 so that the subsequent data is transferred in the vertical direction in the shift registers VCCD, and in the horizontal direction in the shift register HCCD in accordance with the horizontal drive signal φH. The data is then transmitted to the memory 6, then the data is compressed and recorded as described above.

The above process is repeated until all the image data has been compressed and recorded.

In this embodiment, MOS shift registers VCCD are used, and therefore, the shift registers VCCD are capable of holding the accumulated charge (the image data) while the above operation is being performed.

FIG. 5 illustrates an allowance/inhibition of transmission of the vertical drive signal φV in gate circuit 12. As shown in FIG. 5, the charge transfer signal TG is output after the recording switch 16 is depressed, resulting in the CCD 1 accumulating charge corresponding to the object image. As described above, the charge accumulated on each photodiode PD is transferred to its respective shift registers VCCD when the charge transfer signal TG is generated.

Depending on the compression ratio selected, the microprocessor 14 controls the gate circuit 12 to regulate the number of vertical drive signals φV sent to the CCD driver 13.

For example, as shown in FIG. 5, if the compression ratio is ¼, the microprocessor 14 regulates the gate circuit 12 to allow eight vertical drive signals φV to be inputted to the CCD driver 13 so that eight lines of image data are outputted from the CCD 1 to be image stored in the memory 6. The gate section 12 then inhibits the next six vertical drive signals φV from being inputted to the CCD driver 13, i.e., the six vertical drive signals φV are made invalid. The final horizontal drive pulse φH is output, which transfers the last row of data stored in the horizontal shift register HCCD to the CDS A/D before the first vertical drive signal φV is made invalid. Thereafter, no more data is transferred to the horizontal shift register HCCD (and therefore, out of the CCD 1) during the period that the vertical drive signals φV are made invalid. This allows the compression and recording of the image data, stored in the memory 6, to be carried out during this period.

Further, as shown in FIG. 5, if the compression ratio is ⅛, then 3 vertical drive signals φV are inhibited from being sent to the CCD driver 13. If the compression ratio is 1/16, then 2 vertical drive signals φV are inhibited from being sent to the CCD driver 13.

The number of invalid vertical drive signals is calculated as follows:

First, a gate period tg. during which the gate circuit 12 inhibits the vertical drive signals φV from being sent to the CCD driver 13 is calculated by the equation.

$$tg = m \cdot P \cdot L \cdot tc \cdot n \quad (1)$$

where m is a coefficient intrinsic to a construction of the system;

P is the number of pixels on one horizontal line of the CCD;

tc is a time required to record one byte of data;

L is the number of rows of a matrix of pixels to be compressed at one time; and n is the compression ratio.

Then, a number of invalid vertical drive signals N, which is the quotient of tg/th rounded up to the next highest integer value is determined, where th is a horizontal scanning period (64 μsec for an NTSC signal) of the CCD 1.

For example, a CCD having 380,000 elements will be illustrated below.

P=768

L=8(compression is executed for each 8×8 matrix)

m=1.5(m=2 if the color difference signals are synchronized in phase when the Y signal and a color difference line sequential signal are compressed).

From the above, the gate period tg is tg=1.5×768×8×n×tc=9216n.tc

If tc=140 nsec, gate periods tg4, tg8 and tg16 corresponding to the compression ratios of ¼, ⅛ and 1/16, respectively, are calculated as follows.

If n=¼, tg4=322.56 μsec, N>322.56/64=5.04, therefore N=6;

If n=⅛, tg8=161.28 μsec, N>161.28/64=2.53, therefore N=3; and

If n=1/16, tg16=80.64 μsec, N>80.64/64=1.26, therefore N=2.

Figure 6:
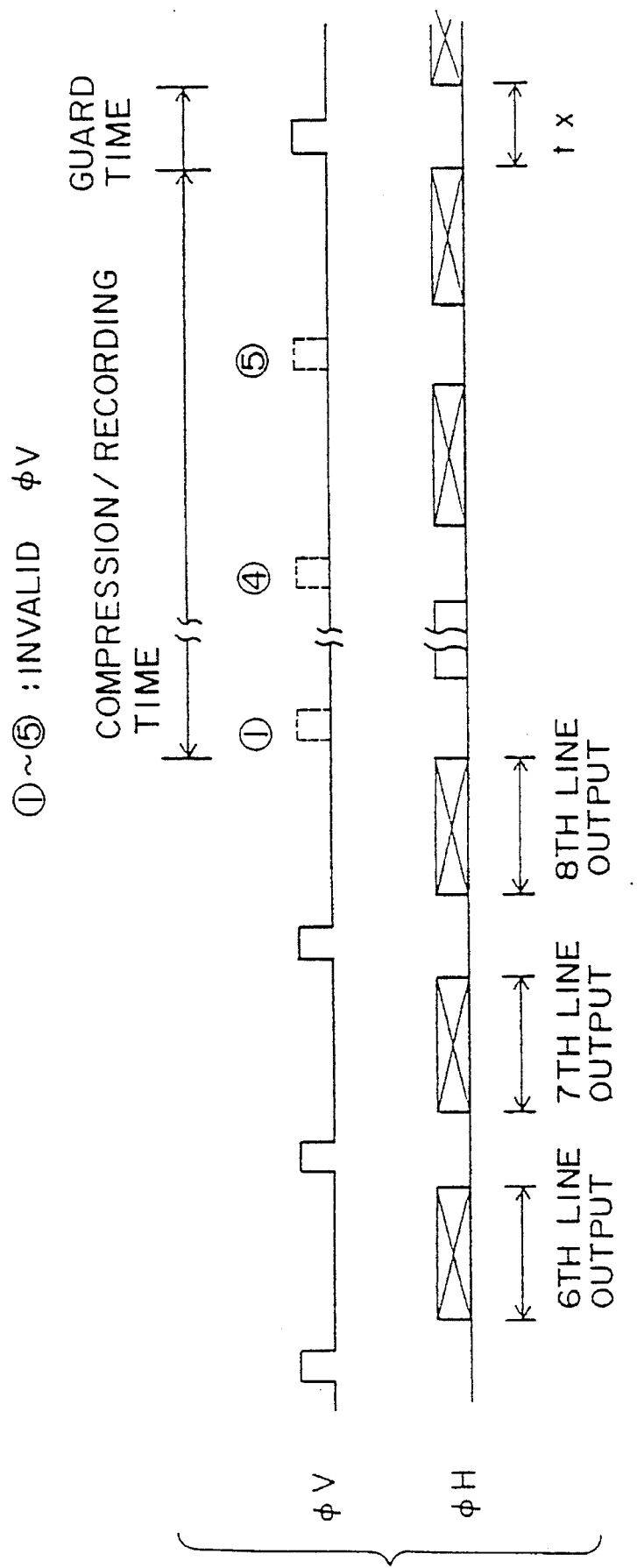
FIG. 6 shows a timing diagram of an operation of the CCD camera shown in FIG. 1.

As shown in FIG. 6, since there is a period tx between the periodic outputs of the image data (i.e., tx is a guard time), the gate period tg can be reduced by tx, and the number of invalid vertical drive signals φV can be decreased. For example, when the compression ratio is ¼, tg/th=5.04, as shown above. In order to reduce the value of N from 6 to 5, tg/th must be less than or equal to 5. Therefore, tg must be reduced by 0.04×th=0.04×64 μsec=2.56 μsec. Therefore, if tx is greater than 2.56 μsec, by not having a guard time tx, gate period tg can be reduced such that the number of invalid vertical drive signals N, is reduced to 5.

Practically, if the camera embodying the present invention has a memory card for its exclusive use, the recording time tc can be made constant. In this case, it is not necessary to calculate the number of invalid vertical drive signals. These numbers can be determined beforehand and stored in a memory built in the microprocessor 14. By employing this construction, the microprocessor 14 can immediately output a control signal corresponding to the selected compression ratio.

Further, for a camera capable of recording image data at high speed, the number of invalid vertical drives signals may be calculated in accordance with the longest period necessary for processing the signal.

As described above, according to the present invention, the image data obtained by the CCD is intermittently outputted. The outputted image data is stored in a memory, and then compressed and recorded at predetermined intervals. If the interval of the output of the image data and the periods necessary for compression and recording satisfy the requirements described above, then the capacity of the memory required for temporarily storing the image data can be made much smaller than a corresponding field memory, thereby decreasing the size of the camera as well as the cost of manufacturing the camera.

In the embodiment, by gating the vertical drive signal φV at a predetermined interval, an ordinary CCD can be used, and the construction of the camera can be simplified.

The timing of the outputting the image data can be adjusted in accordance with to the compression ratio and various other information such as the resolution modes, by calculating the number of invalid vertical drive signals. Further, the present invention is not limited to a camera described above, but is applicable to other imaging devices which use different compression ratios and/or recording media.

The present disclosure relates to a subject matter contained in Japanese Patent Application No. HEI 5-258970, filed on Sep. 24, 1993, which is expressly incorporated herein in its entirety.

What is claimed is:

1. A CCD digital camera, comprising:

a data processing unit;

a matrix of photoelectric detectors, each photoelectric detector of said matrix of photoelectric detectors outputting an electrical signal of a first size corresponding to light received from an image of an object to be photographed;

a plurality of vertical transfer shift registers extending in a column direction that are connected to a corresponding photoelectric detector of said matrix of photoelectric detectors, each of said plurality of vertical transfer shift registers storing a charge corresponding to said electrical signal output by each photoelectric detector of said matrix of photoelectric detectors;

a horizontal transfer shift register extending in a row direction that is connected to an output of a corresponding one of said plurality of vertical transfer shift registers;

a memory sized to store a predetermined portion of said electrical signal predetermined portion said electrical signal being equal to a second size that is smaller than said first size of said electrical signal;

a controller that controls a transfer of said predetermined portion of said electrical signal to said memory;

a data compression unit that compresses said predetermined portion of said electrical signal stored in said memory and outputs a compressed signal corresponding to said predetermined portion of said electrical signal; and a storage device that stores said compressed electrical signal, wherein said data processing unit outputs said electrical signal to said memory, said controller controlling said plurality of vertical transfer shift registers to shift said charge to said horizontal transfer shift register and to control horizontal transfer shift register to transfer said charge to said data processing unit, said controller outputting vertical drive pulses for shifting said charge stored in said vertical transfer shift registers down to an adjacent register and to inhibit a transfer of a subsequent predetermined portion of said electrical signal to said memory until all of said predetermined portion of said electrical signal has been compressed by said data compression unit and stored in said storage device, said controller inhibiting an output of said vertical drive pulses until all of said predetermined portion of said electrical signal has been stored in said storage device.

2. The CCD digital camera according to claim 1, wherein said data compression unit is capable of compressing said predetermined portion of said stored digitized signal at a plurality of compression ratios, said controller allowing and inhibiting a transmission of image data in accordance with a compression ratio of said data compression unit.

3. The CCD digital camera according to claim 2, wherein fractional portions of said predetermined portion of said electrical signal are transferred to said data compression unit, said data compression unit compressing said fractional portions of said predetermined portion of said electrical signal, said fractional portions of said predetermined portion of said electrical signal being compressed in sequence such that all of said predetermined portion of said electrical signal is compressed.

4. The CCD digital camera according to claim 3, wherein said predetermined portion comprises a minimum amount necessary for said data compression unit to execute compression.

5. The CCD digital camera according to claim 1, wherein said controller controls said vertical transfer shift register and said horizontal transfer shift register to transfer a predetermined number of charges from said vertical transfer shift registers to said data processing unit, said predetermined number of charges corresponding to said predetermined portion of said electrical signal stored in said memory.

* * * * *

UNITED STATES PATENT AND TRADEMARK OFFICE
CERTIFICATE OF CORRECTION

PATENT NO. : 5,526,047
DATED : June 11, 1996
INVENTOR(S) : Keiji SAWANOBORI

It is certified that error appears in the above-indentified patent and that said Letters Patent is hereby corrected as shown below:

On the Title page, item [54] and in Column 1, line 1 please change "Scheme Camera Employing Compression Recording" to
    ---Camera Employing Compression Recording Scheme---.

Signed and Sealed this

Fifteenth Day of April, 1997

*Attest:*

BRUCE LEHMAN

*Attesting Officer*      *Commissioner of Patents and Trademarks*